United States Patent [19]

Pouchol et al.

[11] Patent Number: 4,863,985
[45] Date of Patent: Sep. 5, 1989

[54] AQUEOUS SILICONE EMULSIONS CROSSLINKABLE INTO ELASTOMERIC STATE

[75] Inventors: Jean-Marie Pouchol, Lyons; Jean Ulrich, Saint-Symphorien D'Ozon, both of France

[73] Assignee: Rhone-Poulenc Chimie, Courbevoie, France

[21] Appl. No.: 260,016

[22] Filed: Oct. 20, 1988

[30] Foreign Application Priority Data

Oct. 20, 1987 [FR] France ................................ 87 14748

[51] Int. Cl.$^4$ .......................... C08K 5/55; C08K 3/38
[52] U.S. Cl. .................................. 524/183; 524/184; 524/405; 524/588; 524/437
[58] Field of Search ............... 524/588, 405, 183, 184, 524/437

[56] References Cited

U.S. PATENT DOCUMENTS

| | | | |
|---|---|---|---|
| 2,721,857 | 10/1955 | Dickmann | 524/405 |
| 3,070,560 | 12/1962 | Metevia | 524/405 |
| 3,146,799 | 9/1964 | Fekete | 524/588 |
| 3,294,725 | 12/1966 | Findlay et al. | 524/745 |
| 3,330,797 | 7/1967 | Kelly et al. | 524/588 |
| 3,355,406 | 11/1967 | Cekada | 524/263 |
| 3,360,491 | 12/1967 | Axon | 524/588 |
| 3,697,469 | 10/1972 | Ikoma | 524/837 |
| 3,772,240 | 11/1973 | Greenlee | 524/405 |
| 4,221,688 | 9/1980 | Johnson et al. | 524/178 |
| 4,244,849 | 1/1981 | Saam | 524/442 |
| 4,252,709 | 2/1981 | Skostins | 524/588 |
| 4,289,681 | 9/1981 | Nauroth et al. | 524/588 |
| 4,405,425 | 9/1983 | Schiller et al. | 524/588 |
| 4,690,967 | 9/1987 | La Garde et al. | 524/183 |

FOREIGN PATENT DOCUMENTS 0134912 3/1985 European Pat. Off. .
0149382 7/1985 European Pat. Off. .

*Primary Examiner*—Veronica P. Hoke
*Attorney, Agent, or Firm*—Burns, Doane, Swecker & Mathis

[57] ABSTRACT

Thixotropic silicone emulsions crosslinkable into elastomeric state upon removal of water therefrom, e.g., to fabricate elastomer seals for the construction industry, have a pH of from 4 to 8 and a solids content of at least 50%, and contain:

(A) 100 parts of an oil-in-water emulsion of an $\alpha,\omega$-(dihydroxy)polydiorganosiloxane, and a stabilizing amount of at least one anionic or nonionic surface-active agent, or mixture thereof;
(B) 1 to 15 parts of a siliceous reinforcing filler in powder form;
(C) 0 to 250 parts of an inorganic filler other than the siliceous filler (B);
(D) 0.01 to 2 parts of a catalytic tin compound; and
(E) 0.1 to 5 parts of boric oxide, a boric acid or a borate.

13 Claims, No Drawings

AQUEOUS SILICONE EMULSIONS CROSSLINKABLE INTO ELASTOMERIC STATE

BACKGROUND OF THE INVENTION

1. Field of the Invention

The present invention relates to novel aqueous silicone emulsions crosslinkable into elastomeric state upon removal of water therefrom.

2. Description of the Prior Art

U.S. Pat. No. 2,891,920 describes a process for the emulsion polymerization of polydiorganosiloxanes employing an acidic or basic catalyst in the presence of anionic, cationic or nonionic surface-active agents. This patent notes that the emulsions produced are stable in storage and, after the addition of fillers, can be used to formulate paints which form continuous coatings on removal of water.

U.S. Pat. No. 3,294,725 describes, in particular, the use of dodecylbenzenesulfonic acid to polymerize polydiorganosiloxanes in emulsion. The '725 patent teaches that, in order to produce stable emulsions, it is desirable to adjust the pH of the emulsions to a value of approximately 7. This patent also notes that an elastomeric coating can be obtained from such neutralized emulsions, to which colloidal silica and a polyalkoxysilane have been added.

The disclosure of U.S. Pat. No. 3,360,491 is similar to that of U.S. Pat. No. 3,294,725, except that dodecylbenzenesulfonic acid is replaced with lauryl hydrogen sulfate.

U.S. Pat. No. 3,355,406 describes, inter alia, a silicone latex comprising:

(i) an aqueous colloidal suspension of an $\alpha,\omega$-(dihydroxy)polydiorganosiloxane;

(ii) a filler necessarily comprising a silsesquioxane in the form of a colloidal suspension; and (iii) a catalyst selected from among inorganic acids, strong bases, dialkyltin diacylates and organic or inorganic peroxides.

U.S. Pat. No. 3,697,469 describes a particular process for emulsion polymerization of polydiorganosiloxanes and indicates the possibility of adding colloidal silica and a tin salt to such emulsion with a view to providing an elastomeric coating by evaporation of water.

French Patent FR-A-2,110,358 describes a silicone emulsion at a pH of from 6.5 to 9, which crosslinks into an electrically conducting elastomer after evaporation of water on the incorporation of carbon black. The emulsion, which also contains a tin salt and a polyalkoxysilane, is not stable in storage and must be stored in two separate containers (two-component emulsion).

U.S. Pat. Nos. 4,221,688 and 4,244,849, and French Patent FR-A-2,463,163, describe silicone emulsions which are stable in storage and which comprise:

(i) an anionically stabilized emulsion of an $\alpha,\omega$- (dihydroxy)polydiorganosiloxane polymer;

(ii) a siliceous filler;

(iii) a tin salt; and (iv) optionally, a nonreinforcing filler.

The siliceous filler may be a colloidal silica (U.S. Pat. No. 4,221,688), sodium silicate (U.S. Pat. No. 4,224,849) or an amorphous silica powder (FR-A-2,463,163).

When compared to the known aqueous emulsions of the prior art, these three patents teach, on the one hand, that in order to produce a single-component emulsion which is stable in storage, it is necessary to maintain the emulsion at an alkaline pH above 8.5 or 9, preferably above 10 and, on the other hand, to incorporate a tin salt in the emulsion in order to shorten to a few days the emulsion aging stage necessary to provide an acceptable storage stability before it is packaged in a single container.

While the adjustment of the emulsion to an alkaline pH has made it possible to improve the storage stability in comparison with the known emulsions stored at a neutral or basic pH, it has become apparent that the elastomer obtained after water evaporation exhibits a major change in its mechanical properties over time, in particular in respect of elongation, which may be disadvantageous.

This change in mechanical properties is not a surprising phenomenon in this art. Indeed, it is well known that, in an alkaline medium, silicone polymers depolymerize to low molecular weight species, including the monomer species.

Such scissions of the silicone chains are, of course, the major factor in the changes in mechanical properties of the elastomer over time, namely, during its aging.

Furthermore, known filled silicone emulsions stored at an acidic or neutral pH exhibit at least one of the following disadvantages:

(a) they are not stable in storage when they are packaged in a single container (single-component composition);

(b) they exhibit an excessively long time for curing into an elastomer; and (c) they are not thixotropic.

SUMMARY OF THE INVENTION accordingly, a major object of the present invention is the provision of improved aqueous silicone emulsion adopted for crosslinking into elastomeric state on removal of water therefrom, at ambient temperature, and which improved emulsions conspicuously avoid or ameliorate those disadvantages and drawbacks to date characterizing the state of the art.

Another object of this invention is the provision of improved silicone emulsions of the above type, which are stable in storage, and which crosslink properly and sufficiently quickly into an elastomer on removal of water at ambient temperature, while the elastomers formed retain their mechanical properties upon aging thereof.

A further object of this invention is the provision of improved silicone emulsions for producing elastomers which also exhibit improved flame resistance.

Briefly, the present invention features silicone emulsions, crosslinked into elastomeric state upon removal of water under ambient conditions, and comprising:

(A) 100 parts by weight of an emulsion of the oil-in-water in-water type of an $\alpha,\omega$-(dihydroxy)polydiorganosiloxane, stabilized with at least one surface-active agent selected from among the anionic and nonionic surface-active agents and mixtures thereof; (B) 1 to 15 parts by weight of a siliceous reinforcing filler in powder form; (C) 0 to 250 parts by weight of an inorganic filler other than the siliceous filler (B); (D) 0.01 to 2 parts by weight of a catalytic tin compound; and (E) 0.1 to 5 parts by weight of an oxygenated boron compound selected from among boric oxide, boric acids and borates; and said emulsion having a pH ranging from 4 to 8 and a solids content of at least 50%.

DETAILED DESCRIPTION OF THE PREFERRED EMBODIMENTS OF THE INVENTION

More particularly according to the present invention, the α,ω-(dihydroxy)polydiorganosiloxanes must have a viscosity of at least 100 mPa.s at 25° C., preferably of at least 50,000 mPa.s. Indeed, it is in the case of viscosities above 50,000 mPa.s that elastomers are produced which exhibit a notable combination of suitable mechanical properties, in particular in respect of Shore A hardness and elongation. Furthermore, the higher the viscosity, the greater the extent to which the mechanical properties are retained as the elastomers age. The preferred viscosities according to the present invention range from 50,000 to 1,500,000 mPa.s at 25° C.

The organic radicals in the α,ω-(dihydroxy)polydiorganopolysiloxanes are monovalent hydrocarbon radicals containing up to 6 carbon atoms, optionally substituted by cyano or fluoro groups. The substituents which are generally employed because of their commercial availability are methyl, ethyl, propyl, phenyl, vinyl and 3,3,3-trifluoropropyl radicals. In general, at least 80% of the number of these radicals are methyl radicals.

According to the present invention, particularly preferred are α,ω-(dihydroxy)polydiorganosiloxanes prepared by the anionic polymerization process described in the aforementioned U.S. Pat. Nos. 2,891,920 and especially 3,294,725 (hereby incorporated by reference). The polymer obtained is stabilized anionically with a surface-active agent which, in accordance with the teachings of U.S. Pat. No. 3,294,725, is preferably an alkali metal salt of an aromatic hydrocarbon sulfonic acid, the free acid also serving as a polymerization catalyst.

The preferred catalyst and surface-active agent are dodecylbenzenesulfonic acid and its alkali metal salts, particularly its sodium salt. Other anionic or nonionic surface-active agents may be added, if desired. However, this addition is not necessary because, in accordance with U.S. Pat. No. 3,294,725, the amount of anionic surface-active agent resulting from the neutralization of the sulfonic acid is sufficient to stabilize the polymer emulsion. This amount is generally below 3%, preferably 1.5% of the emulsion weight.

This emulsion polymerization process is particularly advantageous because it makes it possible to produce the emulsion (A) directly. Furthermore, this process allows the possibility of producing α,ω-(dihydroxy)-polydiorganosiloxane emulsions (A) of very high viscosity without difficulty.

To prepare the emulsion (A), it is also possible to begin with an α,ω-(dihydroxy)polydiorganosiloxane which is already polymerized, and to then convert it into an aqueous emulsion by stabilizing the emulsions with anionic and/or nonionic surface-active agent according to a process which is well known to this art and described in detail in the literature (see, for example, FR-A-2,064,563, FR-A-2,094,322, FR-A-2,114,230 and EP-A-169,098).

According to this process, the α,ω-(dihydroxy)-polydiorganosiloxane polymers are mixed merely by stirring with the anionic or nonionic surface-active agent, it being possible for the latter to be in aqueous solution, to then add water, if necessary, and to convert the entire mass into a fine and homogeneous emulsion by passing same through a conventional colloid mill.

The millbase obtained is subsequently diluted with a suitable amount of water, and an emulsion (A) is thus produced which is stabilized with an anionic or nonionic surface-active agent and which is also stable in storage.

The amount of anionic and nonionic surface-active agent which can be employed is that typically used in the emulsification process, in particular those described in the abovementioned patent and in U.S. Pat. No. 2,891,920.

The anionic surface-active agents which are preferred according to this invention are the alkali metal salts of an aromatic hydrocarbon sulfonic acid and the preferred nonionic surface-active agents are polyoxyethylenated alkylphenols. These nonionic surface-active agents are, of course, the same as those which may be added, if desired, to the emulsions (A) produced by emulsion polymerization as indicated above.

The emulsion (A) prepared by emulsion polymerization, or by emulsifying the silicone polymer, is in the form of an oil-in-water emulsion and, preferably, has a solids content greater than 45% by weight.

1 to 15, preferably 2 to 7, parts by weight of a siliceous reinforcing filler (B) in powder form are incorporated per 100 parts by weight of emulsion (A).

These siliceous reinforcing fillers are pyrogenic or precipitated silica powders, or a mixture thereof. Pyrogenic silica is preferred.

These silica powders are well known to this art; they are employed, in particular, as fillers in silicone elastomer compositions capable of being vulcanized into a silicone rubber when heated. These powders have a mean particle size which is generally below 0.1 μm and a BET specific surface area greater than 50 m$^2$/g, preferably ranging from 150 to 350 m$^2$/g.

The incorporation of this silica reinforcing powder in the emulsion (A) is by any suitable means, particularly by stirring, and considerably increases the viscosity of the emulsion (A), which is then pasty in nature.

It has now been found, in fact, in accordance with the present invention, that the addition of 1 to 15 parts, preferably 2 to 7 parts of a siliceous reinforcing filler in powder form is sufficient, when employed in combination with the constituent (E), to impart a more or less pronounced thixotropic nature to the emulsion. When removed from a storage container, the emulsion adheres without running, even to a vertical substrate, and cures into an elastomer by water evaporation at ambient temperature. Understandably, a slight heating of the composition (to approximately 40°–80° C.) to accelerate the water evaporation is within the ambit of this invention. The emulsion according to the invention is more particularly suitable for the building industry, and for caulking and seal production.

Another optional constituent of the emulsion according to the invention is the addition of 0 to 250, preferably 10 to 200, parts of a semi-reinforcing or nonreinforcing inorganic filler other than the siliceous filler (B).

The fillers (C) have a particle size which generally ranges from 1 to 30 μm and a BET surface area of less than 50 m$^2$/g.

Exemplary of the fillers (C) which can be employed either alone or as mixtures thereof are carbon black, titanium dioxide, aluminum oxide, alumina hydrate, ground quartz, calcium carbonate, zinc oxide, diatomaceous earths, mica and talc.

These fillers (C) are introduced into the emulsion in the form of dry powder, for example merely by mixing.

In an alternative embodiment of the invention, it has been found that if the filler (C) essentially consists of only alumina hydrate in a proportion of 10 to 250, preferably of 50 to 200 parts by weight of alumina hydrate per 100 parts by weight of emulsion (A), an elastomer which has a particularly high flame resistance is produced, which cannot be produced using the other of the abovementioned classes of filler (C), in particular with aluminum oxide or nonhydrated alumina.

The constituent (D) is a catalytic tin compound, generally an organotin salt, preferably introduced in the form of an aqueous emulsion. The organotin salts which can be employed are described, in particular, in the text by Noll, *Chemistry and Technology of Silicones*, Academic Press (1968), page 337.

The product of reaction of a tin salt, in particular of a tin dicarboxylate with ethyl polysilicate, as described in U.S. Pat. No. 3,862,919, can also be used as a catalytic tin compound.

It is also possible to employ the product of reaction of an alkyl silicate or of an alkyl trialkoxysilane with dibutyltin diacetate, as described in Belgian Patent BE-A-842,305.

The preferred tin salts are diorganotin dicarboxylates and particularly dibutyl- or dioctyltin diversatates (British Patent GB-A-1,289,900), dibutyl- or dioctyltin diacetate, and dibutyl- or dioctyltin dilaurate. From 0.01 to 2, preferably from 0.05 to 1 part by weight of organotin salt is employed per 100 parts by weight of (A).

The constituent (E) is an oxygenated boron compound. It is selected from among boric oxide, boric acids and borates.

Boric oxide is also known under the designation of boric anhydride. Orthoboric acid, metaboric acid and tetraboric acid are exemplary boric acids. Triorganoborates and inorganic borates can be employed as the borates. Triethyl borate, triphenyl borate, tribenzyl borate, tricyclohexyl borate, tri(methylsilyl) borate, tri-t-butyl borate, diammonium tetraborate, ammonium pentaborate, sodium tetraborate decahydrate (borax), potassium pentaborate, magnesium diborate, calcium monoborate, barium triborate and zinc metaborate are representative such borates. It is also possible to employ the products of partial hydrolysis of these borates The preferred oxygenated boron compounds (E) are the boric acids.

From 0.1 to 5, preferably from 0.2 to 3 parts by weight of (E) are employed per 100 parts by weight of (A).

The organic boron compounds (E) may be introduced into the silicone emulsion merely by mixing.

The emulsions according to the invention may be formulated in the following manner:

The starting material is an emulsion (A) prepared either by the emulsion polymerization process, and an emulsion stabilized with an anionic and, if desired, nonionic surface-active agent is thus produced, or by emulsifying the $\alpha,\omega$-(dihydroxy)polydiorganosiloxane, and an emulsion stabilized with an anionic and/or nonionic surface-active agent is thus produced.

100 parts by weight of this emulsion (A) are mixed with 0.01 to 2 parts by weight of the catalytic tin compound (D) and 0.1 to 5 parts by weight of an organic boron compound (E) selected from among boric oxide, boric acids and borates.

The mixture thus obtained is preferably heated to from 30° to 60° C. for a few minutes to a few hours and the siliceous reinforcing filler in powder form (B), followed, if desired, by the inorganic filler (C) other than the siliceous filler (B) is added to this mixture while the heating is continued, if desired.

An emulsion which immediately has a pH of from 4 to 8 is generally obtained. When this is not the case, the pH is adjusted by adding an inorganic or organic acid or base.

The constituents (A), (B), (C), (D) and (E) are mixed in such amounts that the final emulsion has a solids content greater than 50%, preferably greater than 60%, but generally lower than 80%. The preferred pH is in the range of from 6 to 7.

To determine the solids content, 2 g of emulsion are placed in an aluminum weighing dish and this is heated for one hour at 150° C. in an air-ventilated oven. After cooling, the dish is weighed again and the residual material is determined as a percentage of the initial 2 g, representing the solids content.

In a preferred alternative form embodiment of the invention, the emulsion, after preparation thereof, is subjected to an aging stage at a pH of from 4 to 8, under heating at a temperature of 40° C. to 80° C. for a period of time which is generally at least one hour.

The higher the aging temperature, the shorter the aging period may be.

This aging stage makes it possible to produce, after the removal of water, an elastomer which immediately has appropriate mechanical properties.

In order to further illustrate the present invention and the advantages thereof, the following specific examples are given, it being understood that same are intended only as illustrative and in nowise limitative.

In said examples to follow, all parts and percentages are given by weight.

EXAMPLE 1:

An emulsion (A) of $\alpha,\omega$-(dihydroxy)polydimethylsiloxane oil was prepared by emulsion polymerization in the presence of free dodecylbenzenesulfonic acid and of its sodium salt.

The oil present in the emulsion had a viscosity of 85,000 mPa.s at 25° C. The emulsion (A) produced contained 1.5 parts of sodium dodecylbenzenesulfonate per 100 parts of emulsion, and had a viscosity of 20,000 mPa.s at 25° C. and a solids content of 58%.

2.6 parts of a tin-based emulsion containing 35% by weight of dibutyltin dilaurate (D) and one part of boric acid (E) were added to 173 parts of emulsion (A) and were homogenized at 40° C.

After 10 minutes of homogenization, 7 parts of pyrogenic silica powder (B) having a BET specific surface area of 300 m$^2$/g and 100 parts of alumina hydrate (C) having a mean particle size of 100 $\mu$m were added.

The final emulsion had a solids content of 70% and exhibited directly a pH of 6.5.

Various batches of this emulsion were aged at 50° C. for different time periods.

Films (sheets) were prepared by spreading the emulsion out, after aging if desired, on a plane surface and water was permitted to evaporate off at ambient temperature.

The following average mechanical properties were measured on the dried films:

(i) the Shore A hardness (SAH) according to ASTM Standard D-2240;

(ii) the tensile strength (TS) according to AFNOR Standard T 46 002, corresponding to ASTM Standard D 412, in mPa.s;

(iii) the elongation at break (EB) in % according to AFNOR Standard T 46 002; and (iv) the elastic modulus (EM) at 100 % elongation, according to AFNOR Standard T 46 002.

The results obtained are reported in Table I below.

COMPARATIVE EXAMPLE 1C:

Operations which were exactly the same as in Example 1 were carried out, except that the emulsion did not contain the constituent (E). The results obtained are reported in Table I below.

TABLE 1:

| Aging time | Example 1 | | | | | | Example 1c | | | | | |
|---|---|---|---|---|---|---|---|---|---|---|---|---|
| (in days) | 0 | 3 | 6 | 7 | 9 | 10 | 0 | 3 | 6 | 7 | 9 | 10 |
| SAH | * | 9 | 19 | 20 | 22 | 22 | ** | 1.5 | 10 | 11 | 13 | 14 |
| TS | * | 0.62 | 0.74 | 0.75 | 0.74 | 0.71 | ** | 0.24 | 0.45 | 0.47 | 0.43 | 0.40 |
| EB | * | 1.178 | 807 | 790 | 720 | 670 | ** | 1.058 | 860 | 850 | 640 | 582 |
| EM | * | 0.21 | 0.36 | 0.37 | 0.38 | 0.38 | ** | 0.10 | 0.20 | 0.21 | 0.23 | 0.24 |

*: elastomeric in character but mechanical properties not measurable
**: no elastomeric character.

From Table I, it will be seen that the immediate realization of suitable mechanical properties can be promptly attained only in the presence of boric acid.

Suitable properties were obtained after 6 days of aging at 50° C.

EXAMPLES 3 TO 5:

These examples demonstrate the good behavior towards flame (self-extinguishing nature) of the elastomers containing alumina hydrate prepared from the emulsions according to the invention.

The emulsions of Examples 3 and 4 had been prepared according to the operating procedure and using the same constituents as in Example 1, except that the amounts and the nature of the filler (C) were varied.

To evaluate flame resistance, the cut section (the cross-section) of a sheet of elastomer 2 mm in thickness and 15 cm × 15 cm in size was placed in a vertical position for 12 seconds in contact with the end of the blue cone of the flame of a Bunsen burner.

The results are reported in Table II below:

TABLE II

| Examples | 3 | 4 | 5 |
|---|---|---|---|
| Parts by weight | | | |
| Emulsion (A) | 173 | 173 | 173 |
| Silica powder (B) | 5 | 5 | 5 |
| Alumina hydrate (C) | 100 | 0 | 0 |
| Nonhydrated alumina (C) | 0 | 0 | 100 |
| Calcium carbonate (C) | 0 | 150 | 0 |
| Tin emulsion (D) | 2.6 | 2.6 | 2.6 |
| Boric acid (E) | 1 | 1 | 1 |
| pH of emulsion | 6.5 | 7.9 | 6.5 |
| Aging (in days) at 50° C. | 7   14 | 7   14 | 7 |
| SAH | 15   20 | 21   25 | 14 |
| TS | 0.56   0.55 | 0.34   0.36 | 0.40 |
| EB | 737   602 | 177   75 | 655 |
| EM | 0.29   0.35 | —    — | 0.30 |
| Self-extinguishability | I     I | B     B | B |

I: Immediate self-extinguishing character. As soon as the flame is withdrawn, the elastomer ceased being consumed.
B: Absence of self-extinguishing character. After withdrawal of the flame, the elastomer continued to burn to complete combustion.

From Table II, it will be seen that alumina hydrate alone can impart self-extinguishability (as flameresistance).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A silicone emulsion crosslinkable into elastomeric state upon removal of water therefrom under ambient conditions, having a pH ranging from 4 to 8 and a solids content of at least 50%, comprising:

(A) 100 parts of an oil-in-water emulsion of an $\alpha,\omega$-(dihydroxy)polydiorganosiloxane, and a stabilizing amount of at least one anionic or nonionic surface-active agent, or mixture thereof;

(B) 1 to 15 parts of a siliceous reinforcing filler in powder form;

(C) 0 to 250 parts of an inorganic filler other than the siliceous filler (B);

(D) 0.01 to 2 parts of a catalytic tin compound; and (E) 0.1 to 5 parts of boric oxide, a boric acid or a borate.

2. The silicone emulsion as defined by claim 1, said tin compound (D) comprising an aqueous emulsion.

3. The silicone emulsion as defined by claim 1, said emulsion (A) having a solids content of at least 45% by weight.

4. The silicone emulsion as defined by claim 1, comprising an alumina hydrate filler (C), in a concentration of at least 10 parts by weight.

5. The silicone emulsion as defined by claim 1, having a pH of from 6 to 7 and a solids content of at least 60%, comprising:

(A) 100 parts of an oil-in-water emulsion of an $\alpha,\omega$-(dihydroxy)polydiorganosiloxane having a viscosity of from 50,000 to 1,500,000 mPa.s at 25°C. and a stabilizing amount of an alkali metal salt of an aromatic hydrocarbon sulfonic acid or a polyoxyethylenated alkylphenol;

(B) 2 to 7 parts of a pyrogenic silica powder;

(C) 50 to 200 parts of an inorganic filler material;

(D) 0.05 to 1 part of a diorganotin dicarboxylate; and (E) 0 2 to 3 parts of boric acid.

6. The silicone emulsion as defined by claim 1, said oil-in-water emulsion (A) comprising stabilizing amounts of an alkali metal salt of an aromatic hydrocarbon sulfonic acid.

7. The silicone emulsion as defined by claim 1, said oil-in-water emulsion (A) comprising stabilizing amounts of a polyoxyethylenated alkylphenol.

8. The silicone emulsion as defined by claim 1, comprising at least 10 parts of said filler (C).

9. A process for the preparation of the silicone emulsion as defined by claim 1, comprising:

(1) admixing the emulsion (A), the catalytic compound (D) and the boron compound (E);

(2) adding the siliceous filler (B) and, optionally, the filler (C) to the resulting mixture; and (3) adjusting the pH of said mixture, if necessary, to a value of from 4 to 8, the total amount of water present being such that the solids content of the final emulsion is at least 50%.

10. The process as defined by claim 9, further comprising aging the resulting emulsion by heating to a temperature of from 40° to 80° C. for at least one hour.

11. The process as defined by claim 10, further comprising packaging the aged emulsion in the absence of air.

12. An elastomer comprising the silicone emulsion as defined by claim 1, in dried state.

13. A sealed package containing the silicone emulsion as defined by claim 1.

* * * * *